Nov. 7, 1950 D. A. BELL 2,529,370

COUPLING APPARATUS FOR WIRELESS ANTENNAS

Filed July 1, 1947 2 Sheets-Sheet 1

INVENTOR
David A. Bell
By Ralph B. Stewart
Attorney

COUPLING APPARATUS FOR WIRELESS ANTENNAS

Filed July 1, 1947 2 Sheets-Sheet 2

INVENTOR
David A. Bell
By Ralph B. Stewart
Attorney

Patented Nov. 7, 1950 2,529,370

UNITED STATES PATENT OFFICE 2,529,370

COUPLING APPARATUS FOR WIRELESS ANTENNAS

David Arthur Bell, London, England, assignor to A. C. Cossor Limited, London, England, a British company Application July 1, 1947, Serial No. 758,340
In Great Britain June 24, 1946

Section 1, Public Law 690, August 8, 1946
Patent expires June 24, 1966

7 Claims. (Cl. 250—9)

Figure 1:
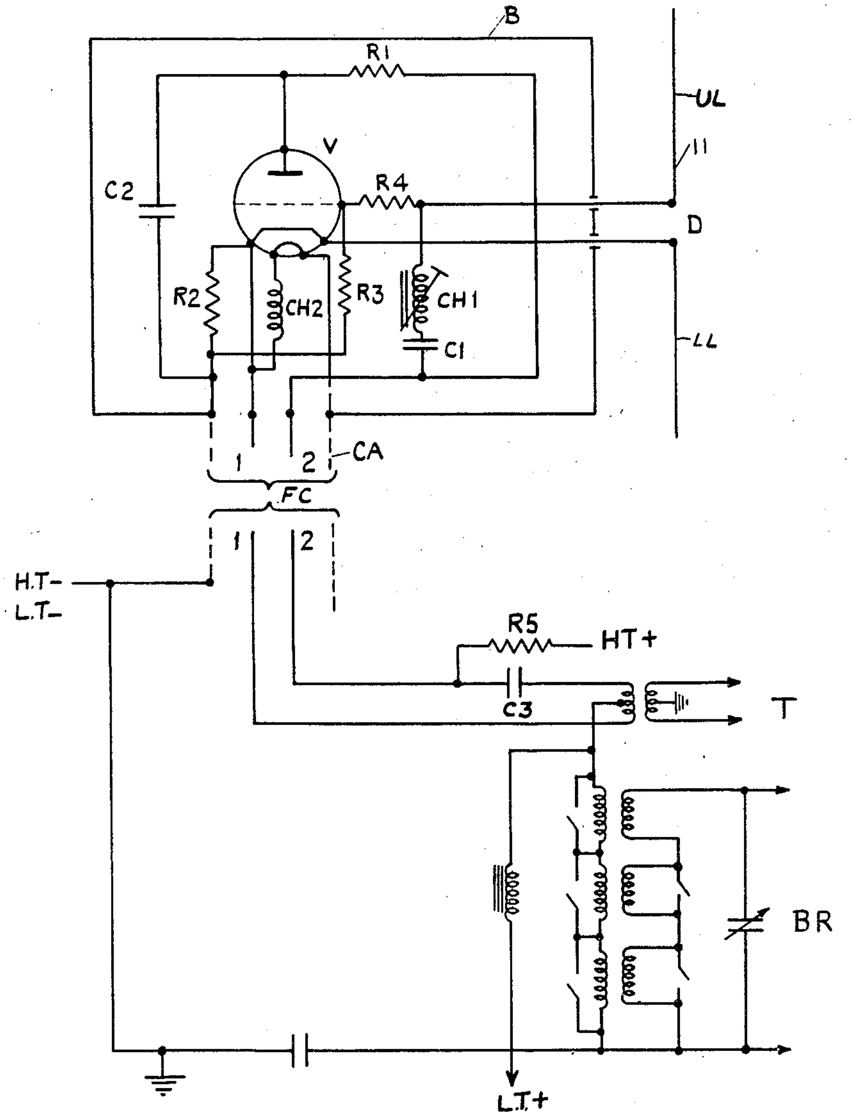

This invention relates to aerials and feeders for the reception of radio signals, particularly signals of very high frequencies such as occur in television transmissions.

One of the objects of the invention is to provide a circuit which functions in effect as a transformer between the aerial and the feeder cable, so that the impedance of the aerial can be approximately matched to the impedance of the feeder.

Another object of the invention is to provide such an impedance-matching circuit which will so function over a wide range of frequencies.

Yet another object of the invention is to provide a circuit functioning as a transformer between an aerial and a feeder, the system serving for the simultaneous reception of both television frequencies and the lower frequencies at present in use for broadcast sound transmissions.

The usual form of aerial for television reception is a dipole adjusted to resonate in the comparatively narrow band of frequencies which it is to receive. Such a dipole has a known and constant impedance. In the case of a centre-fed dipole this impedance is about 70 ohms and the association thereof with a feeder cable is merely a matter of direct connection, since the feeder cable can readily be made to have a characteristic impedance of about 70 ohms also. On the other hand, a suitable type of aerial used for the reception of those lower frequencies that are at present used for broadcasting sound transmissions is the rod collector, which may be the television dipole itself or a separate element. In either case, the rod is likely to be of much shorter length than the wave-length of the signal being received, so that the aerial as seen from the input end of the feeder behaves as a high impedance (capacitive) signal source and in consequence is grossly mismatched with respect to a feeder that is appropriate for television reception. Thus, if such a high impedance aerial were directly connected to a low impedance cable, that cable at some (comparatively) low frequency might be behaving as a capacitance of some 1,000 pf., while the aerial is behaving as a capacitance of 20 pf., so that there will be a 50:1 attenuation and consequent heavy loss of received signal.

Hitherto the most usual method of dealing with this problem has been to provide a transformer between the aerial and the feeder, and in accordance with one feature of the present invention such a transformer is replaced by a circuit of a kind to be described below. It may be mentioned that one of the disadvantages of the normal transformer for this purpose is that it is not practicable to make a transformer which shall be effective for all the broadcast frequencies from say 150 kcs. to 23 mcs.

In accordance with the present invention the circuit effective as a transformer between an aerial and a feeder comprises a cathode follower type of amplifier circuit.

In accordance with another feature of the invention a receiving system for both television and sound has the television dipole directly connected to a feeder and a rod aerial for sound collection (which may as above indicated be the television dipole itself) is connected to the feeder over a cathode follower type of amplifier circuit.

Figure 2:
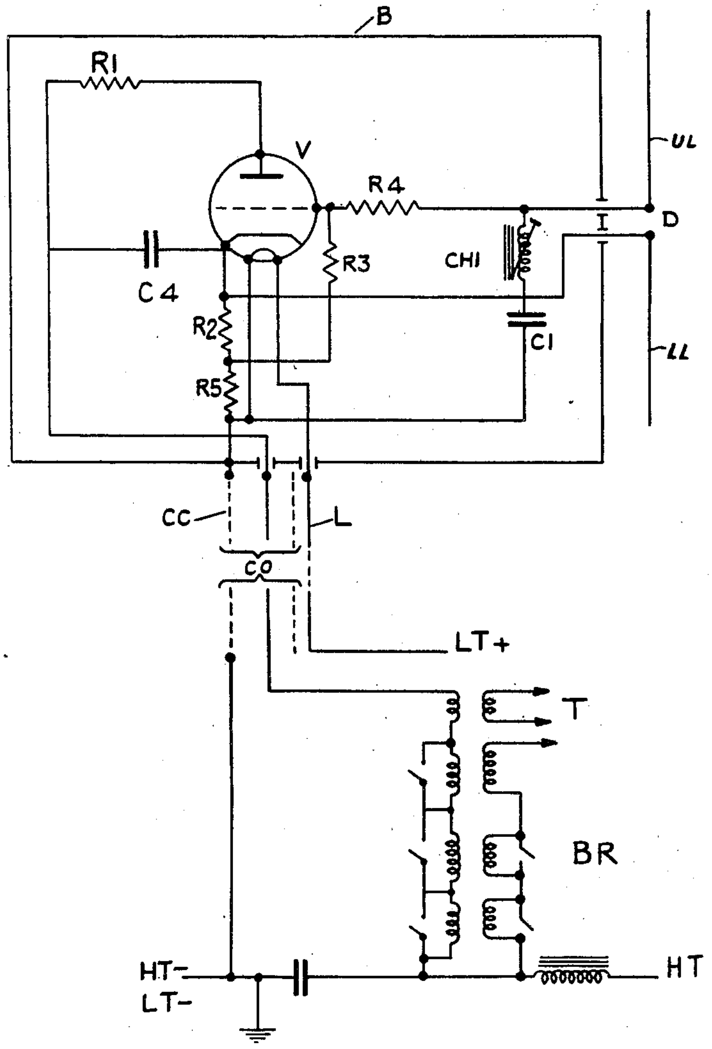

The following description relates to the drawings accompanying this specification showing circuits of a combined television and sound receiving aerial system in accordance with the invention; Figure 1 showing a circuit with a twin conductor feeder cable, and Figure 2 showing a similar circuit using a co-axial feeder cable.

As shown in Figure 1 the television dipole D has its upper limb UL connected over a series acceptor circuit, which consists of a variable inductance CH1 and capacitor C1 to the lead 2 of the feeder cable FC. The lower limb LL of the dipole is directly connected to lead 1 of said feeder cable FC. The output end of the feeder cable has these leads 1 and 2 connected over a capacitor C3 to the primary of the transformer T, of which the secondary is connected to the television receiver in known manner; thus as a television receiving system alone the circuit is straightforward. It is, moreover, independent of the valve V, and failure of this valve would not interfere with reception of television signals.

For the reception of other and lower frequencies than those used for television, an aerial of the rod collector type is used, this rod being the upper limb UL of the dipole D, the lower limb LL having no function in respect of these frequencies. This rod collector is connected over a grid stopper resistor R4 to the grid of a triode valve V, which is arranged in a cathode follower type of amplifying circuit. The function of R4 is to prevent the valve from generating spurious oscillations at an ultra-high frequency. The cathode load resistor R2 (which acts also as the bias resistor) forms the cathode lead of the valve V and is connected at one end to the cathode of the valve V, and at the other end to the screening casing CA of the feeder cable FC. The cathode is connected directly to lead 1 of the feeder cable. Resistor R3 is connected between the grid of valve V and the lower end of resistor R2 and acts as the grid leak resistor. Thus the broadcast signal voltages are developed between lead 1 on the one hand and screening casing CA on the other hand. By a centre tapping of the television transformer T at the output end of the feeder cable, these broadcast frequencies are fed to a multiband broadcast tuning system BR of known type.

Having thus provided a circuit which entails the locating of a thermionic valve at the top end of the masthead, the designer is then confronted with the problem of supplying the valve with filament heater current and anode voltage. The circuit illustrated provides for these supplies without adding further wiring to the feeder cable. The valve filament is connected on the one hand over the choke CH2 to the lead 1, and on the other hand to the screening casing CA. The lead 1 at the lower end is fed with current from source LT+ over a choke which is connected to the centre tapping of the primary on the television transformer T, while the casing CA is directly connected to LT—. For the high tension voltage supply, use is made of the other lead 2 of the feeder cable; thus HT+ is connected over resistor R5 to the lead 2 and is delivered to the anode over the R. F. de-coupling resistor R1 while, as in the case of low tension, the screen casing CA is directly connected to HT—, blocking condensers C2 and C3 fulfilling an obvious purpose. It is to be understood that "L. T.+" and "L. T.—" may be replaced by the terminals of an appropriate source of A. C. for filament heating.

The function of the choke CH2 in the filament lead is to isolate the filament from all radio frequencies, both sound and television. The whole masthead circuit is screened by a metal casing B, which is electrically connected to the feeder screen.

In Figure 2 is shown a circuit which differs from that of Figure 1 by the use of a co-axial feeder cable instead of a screened twin conductor feeder cable as in Figure 1. The down lead consists of a co-axial cable CO and a third separate lead L. The outer conductor CC of the co-axial is connected to the screening box B and to the television frequency acceptor circuit consisting of variable inductance CH1 and condenser C1, and to the cathode load resistor which comprises R2 and R5 in series (R2 also acts as the bias resistor), and to one side of the filament of the valve V, the grid leak resistor R3 being connected from the junction of resistors R2 and R5 to the grid of valve V. The inner conductor of the co-axial is connected to the cathode of valve V via the coupling condenser C4 and over resistor R1 to the anode of the valve. The third lead L is connected to the other side of the filament. At the lower end LT+ is connected to L and HT+ is connected over a choke to the lower end of the transformer's primary system, which at its upper end is connected to the inner conductor of the co-axial. The LT— and HT— supplies are connected to the outer conductor of the co-axial. Apart from these circuit modifications by reason of the use of a co-axial, the feeder cable operates in similar manner to the circuit shown in Figure 1.

I claim:

1. Apparatus for coupling a radio antenna to a radio receiver for receiving two bands of waves of different frequencies, the apparatus comprising an amplifier for connecting the receiver to the antenna, and a circuit connected in shunt with said amplifier, said circuit presenting a relatively low impedance to signals within one frequency band and a relatively high impedance to signals within another frequency band, said amplifier including an output stage having an electron discharge valve, an impedance element connected in the cathode lead of said electron discharge valve, and the output circuit of the amplifier being connected across said impedance element.

2. Apparatus for coupling a radio antenna to a radio receiver for receiving two bands of waves of different frequencies, the apparatus comprising an electron discharge valve having an anode, a cathode and at least one control electrode, a connection from said control electrode to said antenna, a resistive device connected to said cathode, an output connection for the receiver connected to said cathode, and a circuit coupling said control electrode to the end of said resistive device remote from said cathode, said circuit having a relatively low impedance to signals within one frequency band and a relatively high impedance to signals within another frequency band.

3. Apparatus for coupling a radio antenna to a radio receiver, the apparatus comprising an electron discharge valve having an anode, a cathode and at least one control electrode, a connection from said control electrode to said antenna, a resistive device connected in the lead of said cathode, an output connection for the receiver connected to said cathode, and a capacitor connected in series with an inductor between said control electrode and the end of said resistive device remote from said cathode.

4. Apparatus for coupling a radio antenna to a radio receiver, the apparatus comprising an electron discharge valve having an anode, a cathode and at least one control electrode, a connection between said control electrode and said antenna, a transmission line for connecting said valve to said receiver comprising two conductors insulated from one another and surrounded by a conducting casing, a resistive device connecting said casing to said cathode and forming the cathode lead of said valve, and a capacitor and inductor connected in series with one another between said control electrode and one of said conductors, the other of said conductors being connected to said cathode.

5. Radio apparatus comprising a dipole antenna, an electron discharge valve having an anode, a cathode, and at least one control electrode, a connection between one limb of said dipole and said control electrode, a connection between the other limb of said dipole and said cathode, a transmission line comprising two conductors insulated from one another and surrounded by a conducting sheath, a resistive device connecting said sheath to said cathode and forming the cathode lead of said valve, a connection between one of said conductors and said cathode, and a filter circuit connecting said control electrode to the other of said conductors, said filter circuit having a relatively low impedance to signals within a band of frequencies including the resonance frequency of said dipole antenna and a relatively high impedance to signals within another frequency band.

6. Radio apparatus comprising a dipole antenna, an electron discharge valve having an anode, a cathode, and at least one control electrode, a connection between one limb of said dipole and said control electrode, a connection between the other limb of said dipole and said cathode, a transmission line comprising an inner conductor surrounded by and insulated from a conducting casing, a resistive device connecting said casing to said cathode and forming the cathode lead of said valve, means coupling said cathode to said inner conductor, and a filter device connected between said control electrode and said casing, said filter device presenting a relatively low impedance to signals within a band of frequencies including the resonance frequency of said dipole antenna and a relatively high impedance to signals within another frequency band.

7. Radio apparatus comprising a dipole antenna, an electron discharge valve having an anode, a cathode, and at least one control electrode, a connection between one limb of said dipole and said control electrode, a connection between the other limb of said dipole and said cathode, a transmission line comprising a plurality of conductors, a resistive device connecting one of said conductors to said cathode and forming the cathode lead of said valve, means coupling said cathode to another of said conductors, and a filter circuit comprising an inductance and a condenser connected in series between said control electrode and one of said conductors, said filter circuit presenting a relatively low impedance to signals within a band of frequencies including the resonance frequency of said dipole antenna and a relatively high impedance to signals within another frequency band.

DAVID ARTHUR BELL.

REFERENCES CITED

The following references are of record in the file of this patent:

UNITED STATES PATENTS

| Number | Name | Date |
|---|---|---|
| 1,832,621 | Davis | Nov. 17, 1931 |
| 1,915,483 | Beers | June 27, 1933 |
| 2,006,994 | Hopkins | July 2, 1935 |
| 2,103,079 | Johnson | Dec. 21, 1937 |
| 2,226,488 | Clay | Dec. 24, 1940 |
| 2,255,882 | Hathaway et al. | Sept. 16, 1941 |
| 2,256,084 | Goodale et al. | Sept. 16, 1941 |

FOREIGN PATENTS

| Number | Country | Date |
|---|---|---|
| 19,494 of 1934 | Australia | Oct. 10, 1935 |
| 593,793 | Germany | Mar. 5, 1934 |